United States Patent
Pan et al.

(10) Patent No.: US 11,943,786 B2
(45) Date of Patent: *Mar. 26, 2024

(54) UPLINK GRANT, DOWNLINK ASSIGNMENT AND SEARCH SPACE METHOD AND APPARATUS IN CARRIER AGGREGATION

(71) Applicant: InterDigital Patent Holdings, Inc., Wilmington, DE (US)

(72) Inventors: Kyle Jung-Lin Pan, Saint James, NY (US); Jean-Louis Gauvreau, La Prairie (CA); Philip J. Pietraski, Jericho, NY (US); Stephen E. Terry, Northport, NY (US); Guodong Zhang, Woodbury, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/745,484

(22) Filed: May 16, 2022

(65) Prior Publication Data

US 2022/0279494 A1   Sep. 1, 2022

Related U.S. Application Data

(60) Continuation of application No. 17/027,814, filed on Sep. 22, 2020, now Pat. No. 11,337,206, which is a (Continued)

(51) Int. Cl.
*H04W 72/04* (2023.01)
*H04L 5/00* (2006.01)
(Continued)

(52) U.S. Cl.
CPC ............ *H04W 72/23* (2023.01); *H04L 5/001* (2013.01); *H04L 5/0037* (2013.01);
(Continued)

(58) Field of Classification Search
CPC .......... H04W 72/0406; H04W 52/146; H04W 72/042; H04W 52/32; H04W 52/34;
(Continued)

(56) References Cited

U.S. PATENT DOCUMENTS

| 8,194,603 B2* | 6/2012 | Nimbalker | ............ H04L 5/0055 455/454 |
| 8,213,329 B2* | 7/2012 | Ishii | ...................... H04L 1/1887 375/256 |

(Continued)

OTHER PUBLICATIONS

Ericsson, "Uplink Power Control for E-UTRA—Comments on Open Issues," 3GPP TSG-RAN WG1 #50bis R1-074378 (Oct. 8-12, 2007).

(Continued)

*Primary Examiner* — Jung Liu
(74) *Attorney, Agent, or Firm* — Volpe Koenig

(57) ABSTRACT

Methods of mapping, indicating, encoding and transmitting uplink (UL) grants and downlink (DL) assignments for wireless communications for carrier aggregation are disclosed. Methods to encode and transmit DL assignments and UL grants and map and indicate the DL assignments to DL component carriers and UL grants to UL component carriers are described. Methods include specifying the mapping rules for DL component carriers that transmit DL assignment and DL component carriers that receive physical downlink shared channel (PDSCH), and mapping rules for DL component carriers that transmit UL grants and UL component carriers that transit physical uplink shared channel (PUSCH) when using separate coding/separate transmission schemes.

18 Claims, 10 Drawing Sheets

Related U.S. Application Data continuation of application No. 16/423,567, filed on May 28, 2019, now Pat. No. 10,785,768, which is a continuation of application No. 15/795,896, filed on Oct. 27, 2017, now Pat. No. 10,306,620, which is a continuation of application No. 14/673,538, filed on Mar. 30, 2015, now Pat. No. 9,820,269, which is a continuation of application No. 13/654,182, filed on Oct. 17, 2012, now Pat. No. 8,995,376, which is a division of application No. 12/723,308, filed on Mar. 12, 2010, now abandoned.

(60) Provisional application No. 61/160,167, filed on Mar. 13, 2009.

(51) Int. Cl.
| | |
|---|---|
| H04W 52/14 | (2009.01) |
| H04W 52/32 | (2009.01) |
| H04W 72/20 | (2023.01) |
| H04W 72/23 | (2023.01) |
| H04W 52/34 | (2009.01) |

(52) U.S. Cl.
CPC .......... *H04L 5/0053* (2013.01); *H04L 5/0078* (2013.01); *H04L 5/0094* (2013.01); *H04W 52/146* (2013.01); *H04W 52/32* (2013.01); *H04W 72/20* (2023.01); *H04L 5/0007* (2013.01); *H04W 52/34* (2013.01)

(58) Field of Classification Search
CPC .... H04W 72/04; H04L 5/0078; H04L 5/0094; H04L 5/0007; H04L 5/001; H04L 5/0037; H04L 5/0053; H04L 5/0035; H04L 5/0055; H04L 5/0057; H04L 12/2869; H04L 12/5695; H04L 47/00; H04L 47/70; H04L 47/78; H04L 47/821; H04L 47/827
See application file for complete search history.

(56) References Cited

U.S. PATENT DOCUMENTS

| | | | | |
|---|---|---|---|---|
| 2006/0261870 | A1* | 11/2006 | Hayashida | H03L 7/099 327/158 |
| 2010/0182968 | A1* | 7/2010 | Ojala | H04W 72/23 370/329 |
| 2011/0194501 | A1* | 8/2011 | Chung | H04L 5/0053 370/328 |
| 2011/0243039 | A1* | 10/2011 | Papasakellariou | H04L 5/001 370/336 |
| 2012/0034927 | A1* | 2/2012 | Papasakellariou | H04L 1/1861 455/450 |
| 2012/0044821 | A1* | 2/2012 | Kim | H04L 5/0048 455/67.11 |
| 2012/0106407 | A1* | 5/2012 | Papasakellariou | H04W 52/325 370/280 |
| 2012/0106408 | A1* | 5/2012 | Papasakellariou | H04J 3/00 370/280 |
| 2019/0007055 | A1* | 1/2019 | Nelson | H03K 5/133 |

OTHER PUBLICATIONS

Huawei, "PDCCH design for carrier aggregation,"3GPP TSG RAN WG1#55bis, R1-090127 (Jan. 12-16, 2009).
LG Electronics, "Considerations on DL/UL Transmission in Asymmetric Carrier Aggregation,"3GPP TSG RAN WG1 Meeting #55bis, R1-090211 (Jan. 12-16, 2009).
LG Electronics, "PDCCH structure for multiple component carriers in LTE-Advanced," 3GPP TSG RAN WG1 #56bis, R1-091203 (Mar. 23-27, 2009).
Love et al., "PHY 32-1—Downlink Control Channel Design for 3GPP LTE," Wireless Communications and Networking Conference, pp. 813-818 (Mar. 2008).
Motorola, "Common PDCCH Design for Carrier Aggregation," 3GPP TSG RAN1#56bis, R1-091327 (Mar. 23-27, 2009).
Motorola, "Comparison of PDCCH Structures for Carrier Aggregation,"3GPP TSG RAN1#56bis, R1-091326 (Mar. 23-27, 2009).
Motorola, "Control Signalling Design for Supporting Carrier Aggregation," 3GPP TSG RAN1#56, R1-090792 (Feb. 9-13, 2009).
Nortel Networks, "Control channel design for the support of wider bandwidth for LTE-Advanced," TSG-RAN1 #56, R1-090759 (Feb. 9-13, 2009).
Panasonic, "PHICH Linkage for asymmetric carrier aggregation," 3GPP TSG RAN WG1 Meeting #56, R1-090683 (Feb. 9-13, 2009).
Philips, "PDCCH for Carrier Aggregation,"3GPP TSG RAN WG1 Meeting #58, Tdoc R1-093552 (Aug. 24-28, 2009).
Qualcomm Europe, "Multicarrier Control for LTE-Advanced," 3GPP TSG RAN WG1 #56bis, R1-091460 (Mar. 23-27, 2009).
Third Generation Partnership Project, "Technical Specification Group Radio Access Network; Evolved Universal Terrestrial Radio Access (E-UTRA); Multiplexing and Channel Coding (Release 8)," 3GPP TS 36.212 V8.5.0 (Dec. 2008).
Third Generation Partnership Project, "Technical Specification Group Radio Access Network; Evolved Universal Terrestrial Radio Access (E-UTRA); Multiplexing and Channel Coding (Release 8),"3GPP TS 36.212 V8.80 (Dec. 2009).
Third Generation Partnership Project, "Technical Specification Group Radio Access Network; Evolved Universal Terrestrial Radio Access (E-UTRA); Physical Layer Procedures (Release 8),"3GPP TS 36.213 V8.5.0 (Dec. 2008).
Third Generation Partnership Project, "Technical Specification Group Radio Access Network; Evolved Universal Terrestrial Radio Access (E-UTRA); Physical Layer Procedures (Release 8)," 3GPP TS 36.213 V8.8.0 (Sep. 2009).
Third Generation Partnership Project, "Technical Specification Group Radio Access Network; Evolved Universal Terrestrial Radio Access (E-UTRA); Medium Access Control (MAC) Protocol Specification (Release 8)." 3GPP TS 36.321 V8.4.0 (Dec. 2008).
Third Generation Partnership Project, "Technical Specification Group Radio Access Network; Evolved Universal Terrestrial Radio Access (E-UTRA); Medium Access Control (MAC) Protocol Specification (Release 8)." 3GPP TS 36.321 V8.8.0 (Dec. 2009).
Third Generation Partnership Project, "Technical Specification Group Radio Access Network; Evolved Universal Terrestrial Radio Access (E-UTRA); Physical Channels and Modulation (Release 8)," 3GPP TS 36.211 V8.5.0 (Dec. 2008).
Third Generation Partnership Project, "Technical Specification Group Radio Access Network; Evolved Universal Terrestrial Radio Access (E-UTRA); Physical Channels and Modulation (Release 8)," 3GPP TS 36.211 V8.9.0 (Dec. 2009).
Third Generation Partnership Project, "Technical Specification Group Radio Access Network; Evolved Universal Terrestrial Radio Access (E-UTRA); Physical Channels and Modulation (Release 9)," 3GPP TS 36.211 v9.0.0 (Dec. 2009).
Third Generation Partnership Project, "Technical Specification Group Radio Access Network; Evolved Universal Terrestrial Radio Access (E-UTRA) anol Evolved Universal Terrestrial Radio Access Network (E-UTRAN); Overall description; Stage 2 (Release 8)," 3GPP TS 36.300 V8.7.0 (Dec. 2008).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.11.0 (Dec. 2009).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 v9.2.0 (Dec. 2009).
Third Generation Partnership Project, "Technical Specification Group Radio Access Network; Evolved Universal Terrestrial Radio Access

(56) References Cited

OTHER PUBLICATIONS (E-UTRA) Radio Resource Control (RRC); Protocol specification (Release 8)," 3GPP TS 36.331 V8.4.0 (Dec. 2008).
Third Generation Partnership Project, "Technical Specification Group Radio Access Network; Evolved Universal Terrestrial Radio Access (E-UTRA) Radio Resource Control (RRC); Protocol specification (Release 8)," 3GPP TS 36.331 V8.8.0 (Dec. 2009).
Third Generation Partnership Project, "Technical Specification Group Radio Access Network; Evolved Universal Terrestrial Radio Access (E-UTRA) Radio Resource Control (RRC); Protocol specification (Release 9)," 3GPP TS 36.331 v9.1.0 (Dec. 2009).
Third Generation Partnership Project, "Technical Specification Group Radio Access Network; Evolved Universal Terrestrial Radio Access (E-UTRA); Services provided by the physical layer (Release 8);" 3GPP TS 36.302 V8.0.0 (Dec. 2007).
Third Generation Partnership Project, "Technical Specification Group Radio Access Network; Evolved Universal Terrestrial Radio Access (E-UTRA); Services provided by the physical layer (Release 8);" 3GPP TS 36.302 V8.2.0 (Jun. 2009).
Third Generation Partnership Project, "Technical Specification Group Radio Access Network; Evolved Universal Terrestrial Radio Access (E-UTRA); Services provided by the physical layer (Release 9);" 3GPP TS 36.302 v9.0.0 (Dec. 2009).

* cited by examiner

UPLINK GRANT, DOWNLINK ASSIGNMENT AND SEARCH SPACE METHOD AND APPARATUS IN CARRIER AGGREGATION

CROSS REFERENCE TO RELATED APPLICATIONS

This application is a continuation of U.S. patent application Ser. No. 17/027,814, filed Sep. 22, 2020, which is a continuation of U.S. patent application Ser. No. 16/423,567, filed May 28, 2019, which issued as U.S. Pat. No. 10,785,768 on Sep. 22, 2020, which is a continuation of U.S. patent application Ser. No. 15/795,896, filed Oct. 27, 2017, which issued as U.S. Pat. No. 10,306,620 on May 28, 2019, which is a continuation of U.S. patent application Ser. No. 14/673,538, filed Mar. 30, 2015, which issued as U.S. Pat. No. 9,820,269 on Nov. 14, 2017, which is a continuation of U.S. patent application Ser. No. 13/654,182, filed Oct. 17, 2012, which issued as U.S. Pat. No. 8,995,376 on Mar. 31, 2015, which is a divisional of U.S. patent application Ser. No. 14/723,308 filed Mar. 12, 2010, which claims the benefit of U.S. Provisional Application No. 61/160,167 filed Mar. 13, 2009, the contents of which are hereby incorporated by reference herein.

FIELD OF INVENTION

This application is related to wireless communications.

BACKGROUND

Long Term Evolution (LTE) supports data rates up to 100 Mbps in the downlink and 50 Mbps in the uplink. LTE-Advanced (LTE-A) provides a fivefold improvement in downlink data rates relative to LTE using, among other techniques, carrier aggregation. Carrier aggregation may support, for example, flexible bandwidth assignments up to 100 MHz. Carriers are known as component carriers in LTE-A. A wireless transmit/receive unit (WTRU) may simultaneously receive one or more component carriers.

LTE-A may operate in symmetric and asymmetric configurations with respect to component carrier size and the number of component carriers. This is supported through the use or aggregation of up to five 20 MHz component carriers. For example, a single contiguous downlink (DL) 40 MHz LTE-A aggregation of multiple component carriers may be paired with a single 15 MHz uplink (UL) component carrier. Non-contiguous LTE-A DL aggregate carrier assignments may therefore not correspond with an UL aggregate carrier grant.

Aggregate carrier bandwidth may be contiguous where multiple adjacent component carriers may occupy continuous 10, 40 or 60 MHz. Aggregate carrier bandwidth may also be non-contiguous where one aggregate carrier may be built from more than one, but not necessarily adjacent component carriers. For example, a first DL component carrier of 15 MHz may be aggregated with a second non-adjacent DL component carrier of 10 MHz, yielding an overall 25 MHz aggregate bandwidth for LTE-A. Moreover, component carriers may be situated at varying pairing distances. For example, the 15 and 10 MHz component carriers may be separated by 30 MHz, or in another setting, by only 20 MHz. As such, the number, size and continuity of component carriers may be different in the UL and DL.

In LTE, WTRUs receive their data (and in some cases their control information) on the physical downlink shared channel (PDSCH). The transmission of the PDSCH is scheduled and controlled by the base station using the so-called downlink scheduling assignment, which is carried on physical downlink control channel (PDCCH). As part of the downlink scheduling assignment, the WTRU receives control information on the modulation and coding set (MCS), downlink resources allocation (i.e., the indices of allocated resource blocks), and other similar information. Then, if a scheduling assignment is received, the WTRU will decode its allocated PDSCH resources on the correspondingly allocated downlink resources.

In LTE-A, PDSCH(s) to a given WTRU may be transmitted on more than one assigned component carrier and multiple approaches for allocating PDSCH resources on more than one component carrier may exist.

In LTE-A, the PDCCHs or Downlink Control Information (DCI) messages contained therein carrying the assignment information may be separately transmitted for the component carriers containing the accompanying PDSCH transmissions. For example, if there are 2 component carriers, there are 2 separate DCI messages on each component carrier corresponding to the PDSCH transmissions on each component carrier respectively. Alternatively, the 2 separate DCI messages for the WTRU may be sent on one component carrier, even though they may pertain to accompanying data, or PDSCH transmissions on different component carriers. The separate DCI messages of the PDCCHs for a WTRU or a group of WTRUs may be transmitted in one or in multiple component carriers, and may not transmit all of the PDCCHs on every component carrier. For example, a first DCI transmission on the PDCCH pertaining to the PDSCH allocation on a first component carrier may also be contained on this first component carrier, but the second DCI to that WTRU PDCCH transmission pertaining to the PDSCH allocation on a second component carrier may be contained on this second component carrier.

The DCI carrying the assignment information for PDSCH(s) on more than one component carrier may be encoded jointly and carried by one single joint DCI control message, or PDCCH message. For example, a single DCI or PDCCH or control message carrying an assignment of PDSCHs or data resources on two component carriers may be received by the WTRU. In another example, the joint PDCCH for a WTRU or group of WTRUs may be transmitted in one or multiple component carriers.

In LTE-A with carrier aggregation, different PDCCH assignments, coding or allocation schemes represent distinct technical advantages. Both UL grants and DL assignments may be carried by PDCCHs. Due to asymmetric carrier aggregation, PDCCH methods that may be suitable for DL assignments may not be suitable for UL grants. Furthermore, PDCCH methods that are suitable for some configurations or assignments/grants of carrier aggregation may not be suitable for other configurations or assignments/grants of carrier aggregation. For example, in an asymmetric carrier aggregation in which there are more UL component carriers than DL component carriers, a separate PDCCH may be directly used for DL assignment because there exists one-to-one mapping between a DL carrier and the DL carrier that transmits the DL assignment. In other words, a DL assignment that may be transmitted in DL component carrier x carries control information for DL component carrier x. However, in this case separate PDCCH may not be directly used for UL grants because there are more UL component carriers than DL component carriers. This is also true in the case of asymmetric carrier aggregation where more DL component carriers than UL component carriers are used. In addition, when different encoding and transmission schemes are used, how UL grants are mapped to UL component carriers and DL assignments to DL component carriers should be specified.

Methods to associate or map the DL assignment to DL component carrier and UL grant to UL component carrier are desired. This may be particularly true when asymmetric carrier aggregation, UL grants and different encoding/transmission schemes are considered. Optimal methods that are suitable for separate or joint DL assignments and UL grants are desirable.

SUMMARY

Methods of mapping, indicating, encoding and transmitting uplink (UL) grants and downlink (DL) assignments for wireless communications for carrier aggregation are disclosed. Methods to encode and transmit DL assignments and UL grants and map and indicate the DL assignments to DL component carriers and UL grants to UL component carriers are described. Methods include specifying the mapping rules for DL component carriers that transmit DL assignment and DL component carriers that receive physical downlink shared channel (PDSCH), and mapping rules for DL component carriers that transmit UL grants and UL component carriers that transit physical uplink shared channel (PUSCH) when separate coding/separate transmission schemes are used. Methods also include using radio network temporary identification (RNTI), special physical downlink control channel, carrier ID, detection orders, dedicated search space mapping to component carriers and other methods to indicate, implicitly or explicitly, DL/UL component carriers when separate coding/joint transmission and joint coding/joint transmission are used.

BRIEF DESCRIPTION OF THE DRAWINGS

A more detailed understanding may be had from the following description, given by way of example in conjunction with the accompanying drawings wherein.

DETAILED DESCRIPTION

Figure 1:
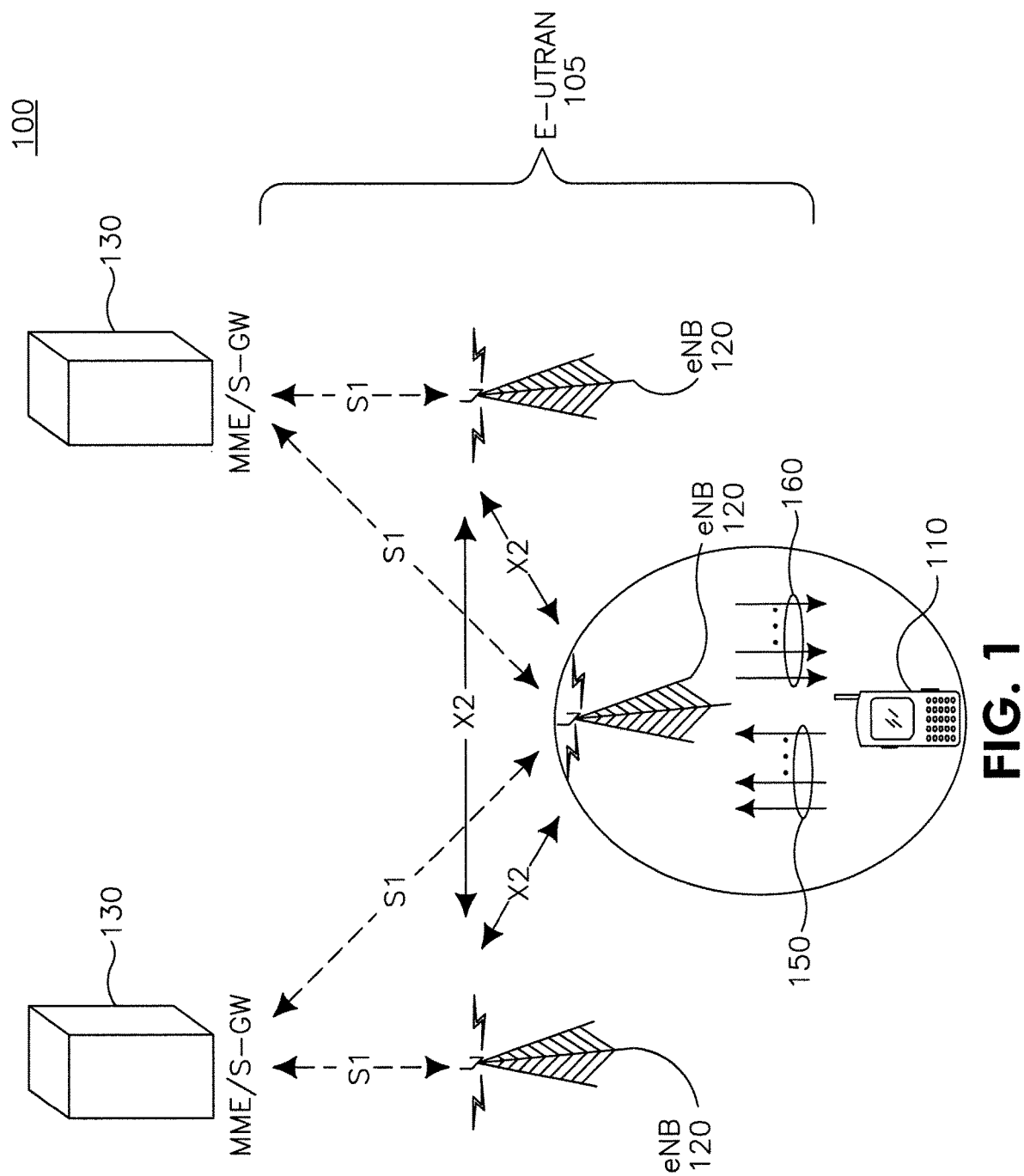
FIG. 1 is an embodiment of a wireless communication system/access network of long term evolution (LTE) and/or LTE-Advanced (LTE-A)

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of device capable of operating in a wireless environment. When referred to hereafter, the terminology "base station" includes but is not limited to a Node-B, evolved Node-B (eNB), a site controller, an access point (AP), or any other type of interfacing device capable of operating in a wireless environment.

In long term evolution-advanced (LTE-A) with carrier aggregation, different physical downlink control channel (PDCCH) assignment, coding or allocation schemes represent distinct technical advantages. Both uplink (UL) grants and downlink (DL) assignments may be carried by the PDCCH. Due to asymmetric carrier aggregation, PDCCH methods that may be suitable for DL assignments may not be suitable for UL grants. Furthermore, PDCCH methods that are suitable for some configurations or assignments/grants of carrier aggregation may not be suitable for other configurations or assignments/grants of carrier aggregation. For example, in an asymmetric carrier aggregation in which there are more UL component carriers than DL component carriers, separate PDCCH may be directly used for DL assignment because there exists one-to-one mapping between a DL carrier and the DL carrier that transmits the DL assignment. In other words, a DL assignment that may be transmitted in DL component carrier x carries control information for DL component carrier x. However, in this case a separate PDCCH may not be directly used for UL grants because there are more UL component carriers than DL component carriers. This is also true for asymmetric carrier aggregation when more DL component carriers than UL component carriers are used. In addition, when different encoding and transmission schemes are used, how UL grants are mapped to UL component carriers and DL assignments to DL component carriers should be specified.

In order to illustrate the methods, different PDCCH methods may be categorized according to how they are encoded and how they are transmitted. Suppose there are DL component carriers and downlink control information (DCI) #n is the DL control information for carrier n. Each DCI may be encoded separately from other DCIs and each may be carried in a PDCCH. They may also be encoded jointly. That is, all DCI n, n=1, 2 . . . N may be encoded together into a single joint DCI with a larger size and may be carried in a single joint PDCCH. After encoding, each PDCCH carrying a DCI may be transmitted in separate DL component carriers or all PDCCHs may be transmitted jointly in one component carrier. When DCIs are encoded separately, it may be referred to as "separate coding" and if they are encoded jointly, it may be referred to as "joint coding". When a PDCCH carrying a DCI is transmitted separately in different component carriers, it may be referred to as "separate transmission". If some or all PDCCHs corresponding to some or all component carriers, respectively, are transmitted all together in one component carrier, it may be referred to as "joint transmission". Based on the combinations of how PDCCHs are encoded and transmitted, several schemes may be possible such as, but not limited to, separate coding/separate transmission, separate coding/joint transmission, or joint coding/joint transmission.

The separate coding/separate transmission PDCCH method provides much flexibility in terms of possible resource assignments. However, this method may not exploit possible coding gain achievable from joint coding. It also may not exploit the power savings possible from having WTRUs monitor PDCCHs on fewer DL component carriers.

The joint coding/joint transmission PDCCH method may result in restrictions regarding allocation flexibility due to the same considerations with respect to payload and mapping into the Control Region. However, this method may result in less overhead and lower WTRU blind detection complexity. Note that this is particularly important for power consumption considerations because joint coding/joint transmission PDCCH method may allow the WTRU to monitor only one DL carrier component at a time. Also, the joint PDCCH approach may suffer from excessive overhead when the number of component carriers used for a specific transmission is low.

Methods to associate or map the DL assignment to DL component carrier and UL grant to UL component carrier are desired. FIG. 1 shows a Long Term Evolution (LTE) and/or LTE-Advanced (LTE-A) wireless communication system/access network 100 that includes an Evolved-Universal Terrestrial Radio Access Network (E-UTRAN) 105. The E-UTRAN 105 includes several evolved Node-Bs, (eNBs) 120. The WTRU 110 is in communication with an eNB 120. The WTRU 110 and eNB 120 may communicate using uplink component carriers 150 and downlink component carriers 160. The eNBs 120 interface with each other using an X2 interface. Each of the eNBs 120 interfaces with a Mobility Management Entity (MME)/Serving GateWay (S-GW) 130 through an S1 interface. Although a single WTRU 110 and three eNBs 120 are shown in FIG. 1, it should be apparent that any combination of wireless and wired devices may be included in the wireless communication system access network 100.

Figure 2:
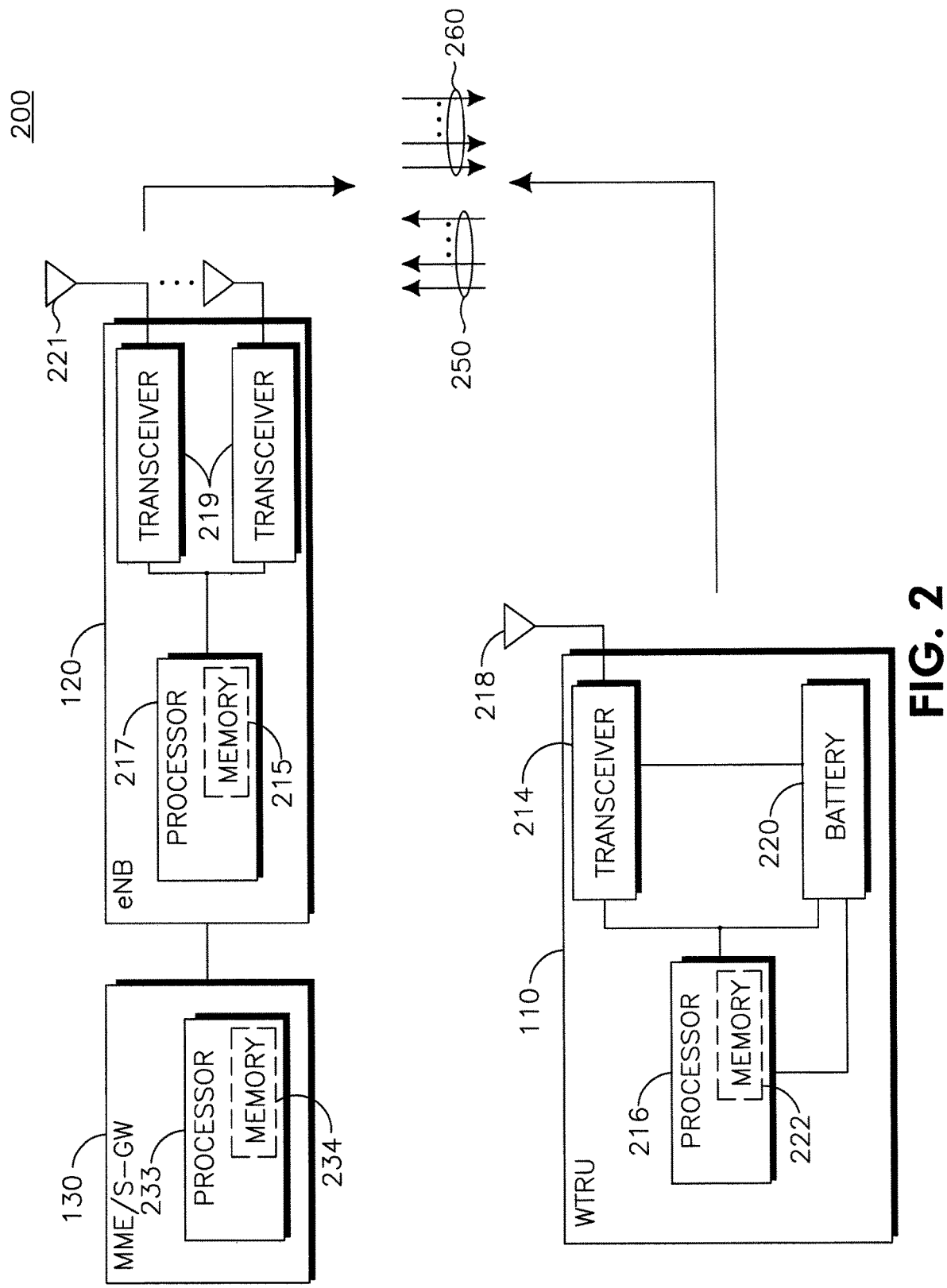
FIG. 2 are example block diagrams of a wireless transmit/receive unit (WTRU) and a base station of the LTE and/or LTE-A wireless communication system.

FIG. 2 is an example block diagram of an LTE or LTE-A wireless communication system 200 including the WTRU 110, the eNB 120, and the MME/S-GW 130. As shown in FIG. 1, the WTRU 110 is in communication with the eNB 120 and both are configured to perform a method wherein uplink transmissions from the WTRU 110 are transmitted to the eNB 120 using multiple component carriers 250, and downlink transmissions from the eNB 120 are transmitted to the WTRU 110 using multiple downlink component carriers 260. As shown in FIG. 2, the WTRU 110, the eNB 120 and the MME/S-GW 130 are configured to perform mapping, indicating, encoding and transmitting of UL grants and DL assignments and searching spaces for wireless communications for carrier aggregation.

In addition to the components that may be found in a typical WTRU, the WTRU 110 includes a processor 216 with an optional linked memory 222, at least one transceiver 214, an optional battery 220, and an antenna 218. The processor 216 is configured to perform mapping, indicating, encoding and transmitting of UL grants and DL assignments and searching spaces for wireless communications for carrier aggregation. The transceiver 214 is in communication with the processor 216 and the antenna 218 to facilitate the transmission and reception of wireless communications. In case a battery 220 is used in the WTRU 110, it powers the transceiver 214 and the processor 216.

In addition to the components that may be found in a typical eNB, the eNB 120 includes a processor 217 with an optional linked memory 215, transceivers 219, and antennas 221. The processor 217 is configured to perform mapping, indicating, encoding and transmitting of UL grants and DL assignments and searching spaces for wireless communications for carrier aggregation. The transceivers 219 are in communication with the processor 217 and antennas 221 to facilitate the transmission and reception of wireless communications. The eNB 120 is connected to the MME/S-GW 130 which includes a processor 233 with an optional linked memory 234.

Figure 3:
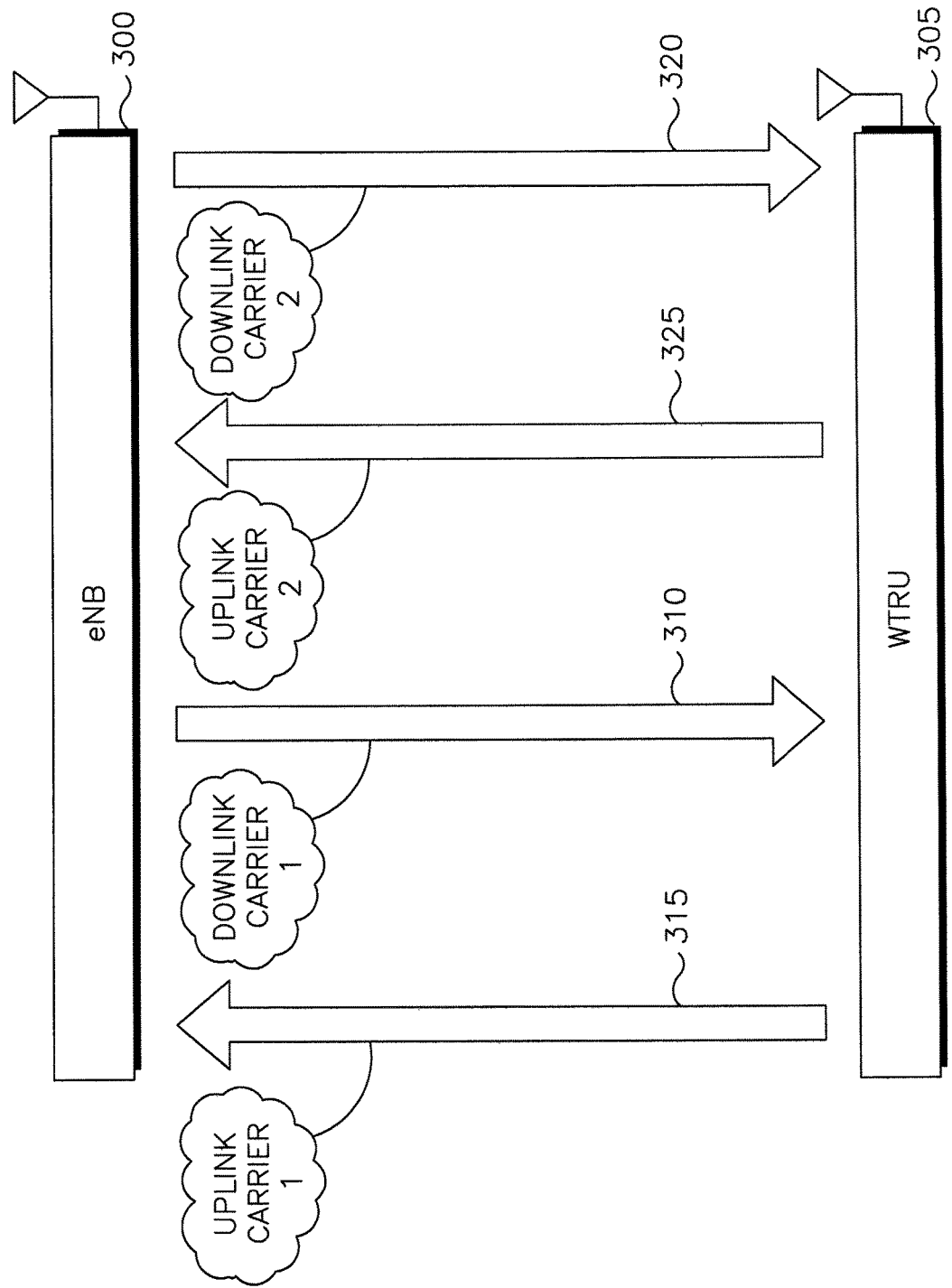
FIG. 3 shows an example of wireless communications using component carriers.

FIG. 3 shows an example of multiple component carriers being transmitted and received between eNB 300 and WTRU 305. For example, the multiple component carriers may include downlink component carrier 1 310, downlink component carrier 2 320, uplink component carrier 1 315 and uplink component carrier 2 325. Downlink component carrier 1 310 and downlink component carrier 2 320 may carry PDCCH(s) that carry downlink control information (DCI) as described herein.

Mapping rules described herein may be generalized and other mapping and association between UL component carriers and DL component carriers that transmit UL grants and DL assignments may be used. Such mapping rules may be signalled, configured or predetermined.

Described herein are example unified methods for UL grants and DL assignments. In a first unified method, separate coding and separate transmission may be used.

For DL assignments, a one-to-one mapping may be defined between the DL component carrier and the DL component carrier that transmits the DL assignment. An example mapping rule may be that a DL assignment transmitted in DL component carrier x carries control information for DL component carrier z, where z=x. This method may work for DL assignments regardless of symmetric or asymmetric carrier aggregation.

For UL grants, a one-to-one mapping may be defined between the UL component carriers and the DL component carriers that transmit UL grants. An example mapping rule may be that an UL grant transmitted in DL component carrier y carries control information for UL component carrier z, where z=f(y) and f(*) is a fixed mapping function that associates the UL and DL component carriers. This method may work for a symmetric number of component carriers in the UL and DL provided f(*) is known to both the WTRU and the base station.

For UL grants with asymmetric carrier aggregation, where asymmetry refers to the number of UL and DL component carriers, additional mapping rules may be required to clearly identify the association between an UL grant and UL component carrier. In the asymmetric case where there are more DL component carriers than UL component carriers, there may be an onto function f(*) such that for each UL component carrier there is at least one DL component carrier that carries UL grants for it. An example mapping rule f(*) may be that an UL grant transmitted in DL component carrier y1, y2 and so on carries control information for UL component carrier z1, UL grant transmitted in DL component carrier y3, y4 and so on carries control information for UL component carrier z2 and so on.

Alternatively, the following rule or method may be used where DL component carriers may be made symmetric to UL component carriers for UL grant purposes. In this method, a subset of DL component carriers may be selected and the number of DL component carriers in the selected component carrier subset may be set equal to the number of UL component carriers. Such a component carrier subset may be signalled, configured or predetermined.

In the case where there are more UL component carriers than DL component carriers, there may be no such onto function but other rules may be used to make UL grants for all UL component carriers. An example mapping rule may be that an UL grant transmitted in DL component carrier y1 carries control information for UL component carriers z1, z2 . . . , UL grant transmitted in DL component carrier y2 carries control information for UL component carriers z3, z4 . . . , and so on. In this case, the same UL grant (thus same control information) may be shared by two or more UL component carriers. In other words, the resource allocation or other control information in the UL grant may be applied to more than one UL component carrier. For example, if the two such UL component carriers have the same bandwidth (BW), the resource allocation for both UL component carriers may be either identical or shifted with a fixed offset which may be configurable. If they do not have the same BW, the resource allocation may be scaled relative to the BW of a particular UL component carrier e.g., by adjusting the resource granularity for resource allocation. Alternatively, a rule that only component carriers having the same BW may share the same UL grant may be applied.

Similarly, the above described approach may be applied to the DL assignment for DL component carriers when the DL assignment is shared by more than one DL component carrier.

The control information payload size may be adjusted to reduce control channel blind decoding complexity. WTRU may be required to monitor only a single payload size control channel format or DCI format instead of two different payload size DCI formats for component carriers having different BWs. The resource allocation may be scaled relative to the BW of a particular DL component carrier. The resource granularity or resource block group (RBG) granularity for resource allocation may be adjusted such that the number of bits for resource allocation is the same if they do not have the same BW. This may be applicable to DL assignments or UL grants that may or may not be shared by multiple component carriers.

Figure 4:
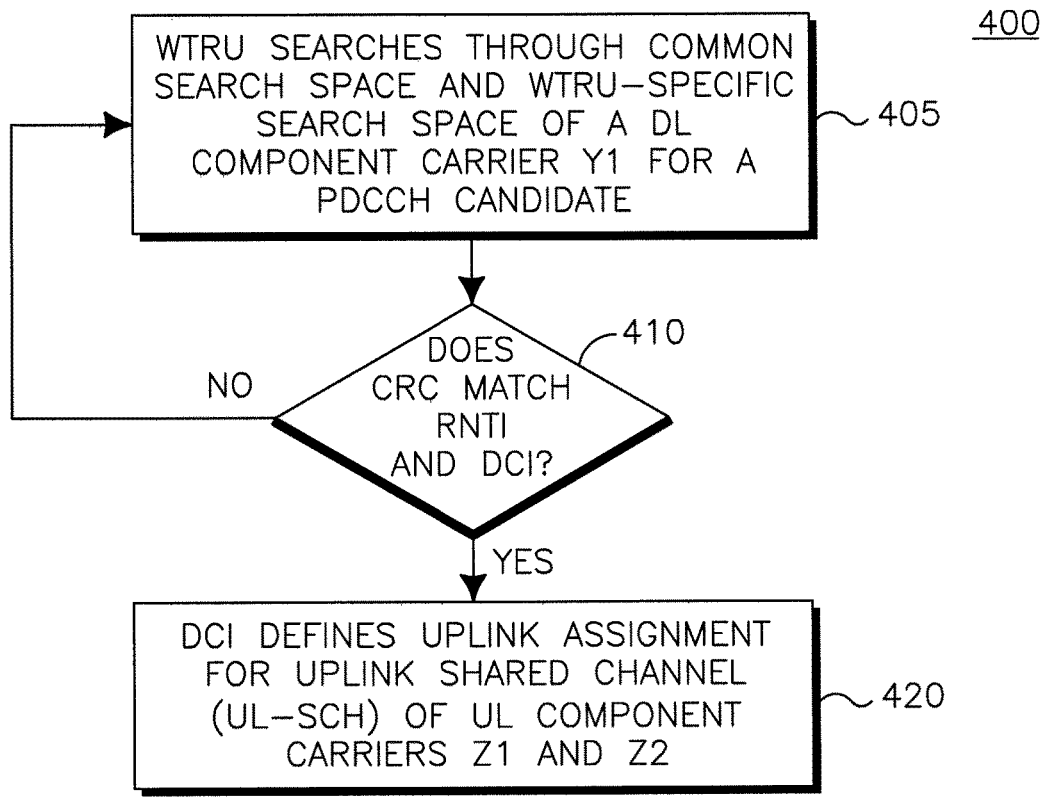
FIG. 4 shows an example flowchart for WTRU procedures in a mapping method for an example asymmetric component carrier configuration.

In this asymmetric case, where there are more UL component carriers than DL component carriers, FIG. 4 illustrates an example flowchart 400 for WTRU procedures using this mapping method. First, the WTRU searches through common search space and WTRU-specific search space of DL component carrier y1 for a PDCCH candidate (405). Second, a PDCCH candidate is determined. A PDCCH candidate is one where the cyclic redundancy code (CRC) matches the WTRU cell radio network temporary identifier (C-RNTI), temporary C-RNTI, semi-persistent RNTI (SPS-RNTI) or other RNTIs that may be used to schedule uplink transmission and DCI format 0 or other UL DCI format (410). If CRC does not match, searching is continued (415). If CRC does match, then the DCI format 0 or other UL DCI format defines the uplink grant for uplink shared channel (UL-SCH) of both UL component carrier z1 and z2 (420). In this context, the grant for both UL component carriers may define the same physical resource blocks (PRBs), that is the same frequency allocation, if they have the same BW.

A variant to this method may use a new DCI format 0 or other UL DCI format for LTE-A where a binary field may define whether the DCI format received applies to all mapped UL component carriers or a subset of component carriers. In this example, a 2 bit field may inform the WTRU that DCI format allocation applies to component carrier z1, component carrier z2 or both. The 2-bit field may also indicate the number of other component carriers taken from an ordinal set to use in the UL transmission, e.g., use a component carrier group taken from the set ((c1), (c1,c2), (c1,c2,c3), (c1,c2,c3,c4)), where c1,c2,c3,c4 are pointers to 4 component carriers provided by default or from the network. Such information may also be configured via higher layer signalling.

Alternatively, different RNTIs may be used to indicate a different set(s) of UL component carriers to use. For example, a WTRU may check for which of a set of possible RNTIs it has been addressed with, which in turn indicates which component carriers to use or which set of component carriers to use.

The mapping of DL component carrier with UL component carriers may be semi-static and defined by a radio resource controller (RRC) message during initial carrier configuration or at some later stage or event. The asymmetric case may take advantage of using a new RRC message that may configure one or more component carriers in only one direction, either UL or DL. For example, in the case described herein, an initial RRC message may map DL component carrier y1 with UL component carrier z1. But subsequently, an RRC message may configure an additional UL component carrier z2 and map it to an existing configured DL component carrier, such as y1.

In a second unified method, separate coding and joint transmission may be used. Each DL assignment and UL grant may be separately encoded but jointly transmitted in an anchor component carrier, primary component carrier or other component carrier designated for the WTRU to monitor. An anchor or primary component carrier may be a component carrier which the WTRU monitors and in which the WTRU receives the DL assignment or UL grant. Because grants/assignments are transmitted jointly in one component carrier, there may be no one-to-one mapping between the component carrier and the component carrier that transmits the UL grant or DL assignment. RNTIs, carrier IDs or other similar designations or indicators may be used, either implicitly or explicitly, per DL assignment or UL grant to map DL assignment to DL component carrier or UL grant to UL component carrier.

In one indication method, RNTIs may be used to indicate the component carriers. For each UL grant or DL assignment, the PDCCH may be masked with, for example, C-RNTI #n, n=1, 2, . . . , N, to indicate which UL or DL component carrier corresponds to which UL grant or DL assignment, respectively. In this case, N is the number of maximum component carriers in one direction. PDCCH masked with C-RNTI #n may carry control information for component carrier n in UL or DL.

Figure 5:
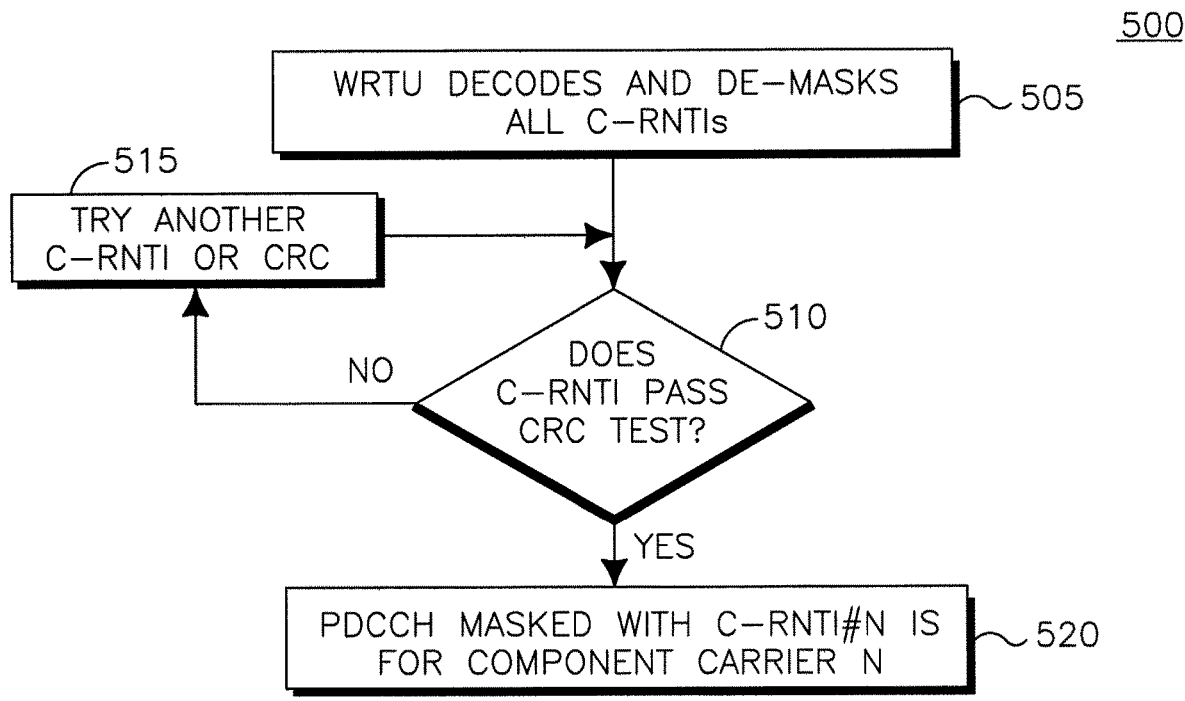
FIG. 5 shows an example flowchart for WTRU procedures if N cell-radio network temporary identifiers are used to indicate N component carriers in either uplink or downlink direction.

FIG. 5 shows an example flowchart 500 that a WTRU may use if N C-RNTIs are used to indicate N component carriers for either UL, DL or both. First, a WTRU may decode and de-mask all C-RNTIs (505). If C-RNTI #n passes the CRC test (510), then PDCCH masked with C-RNTI #n is for component carrier n (520). If C-RNTI #n does not pass the CRC test, then try another component carrier C-RNTI or CRC (515). This example procedure may be applicable to both UL grants and DL assignments. Although a C-RNTI is shown in FIG. 5, the other RNTIs described herein may be used.

In the C-RNTI example, each WTRU may be assigned C-RNTIs for each component carrier. C-RNTIs may be reused for WTRUs. To avoid overlap of searching space or collision of C-RNTIs, WTRUs that have same or overlapping assigned C-RNTIs may be assigned with different downlink anchor or primary component carriers. To balance the signalling load, WTRU-specific downlink anchor or primary component carrier may be used. To relax scheduling restrictions, each WTRU may have unique C-RNTIs. The availability analysis for C-RNTIs is described later herein. In addition to the C-RNTI, SPS-C-RNTI, temporary C-RNTI, or other appropriate RNTIs may be used.

In an illustrative example, suppose the DL component carriers are Carrier 1D, Carrier2D, Carrier3D and the UL component carriers are Carrier 1U and Carrier2U. In this case, N is 3 for DL or N is 2 for UL. Three different C-RNTI, SPS-C-RNTI or other similar RNTI may be required to indicate which DL component carrier the DCI is applicable for and 2 different C-RNTI, SPS-C-RNTI or other similar RNTI may be required to indicate which uplink component carrier the DCI format is applicable to. For example, C-RNTI #1, C-RNTI #2, and C-RNTI #3 may be used to indicate which downlink component carrier #1, #2 or #3 the DCI format is applicable to. C-RNTI #1 and C-RNTI #2 may be used to indicate which uplink component carrier #1 or #2 the DCI format is applicable to.

In another example, power-control messages may be directed to a group of WTRUs using an RNTI specific for that group. Each WTRU may be allocated two power-control RNTIs, one for physical uplink control channel (PUCCH) power control and the other for physical uplink shared channel (PUSCH) power control. The transmit power control PUSCH RNTI (TPC-PUSCH-RNTI) is the identification used for the power control of PUSCH and the transmit power control PUCCH RNTI (TPC-PUCCH-RNTI) is the identification used for the power control of PUCCH. Although the power control RNTIs are common to a group of WTRUs, each WTRU may be informed through RRC signaling which TPC bit(s) in the DCI message it should follow. The TPC-PUSCH-RNTI, TPC-PUCCH-RNTI or both may be used to indicate the component carriers.

Two different TPC-PUSCH-RNTIs and/or two different TPC-PUCCH-RNTIs may be required to indicate to which uplink component carrier the DCI format for power control is applicable to. A new TPC-PUSCH-RNTI or TPC-PUCCH-RNTI would be assigned for each additional uplink component carrier. As described herein, when adding an UL component carrier, an additional RNTI may be added. However, the RNTIs used for indication of DL component carriers may be reused for indication of UL component carriers. This is not the case for TPC-PUSCH-RNTI or TPC-PUCCH-RNTI which are for UL component carriers only.

Figure 6A:
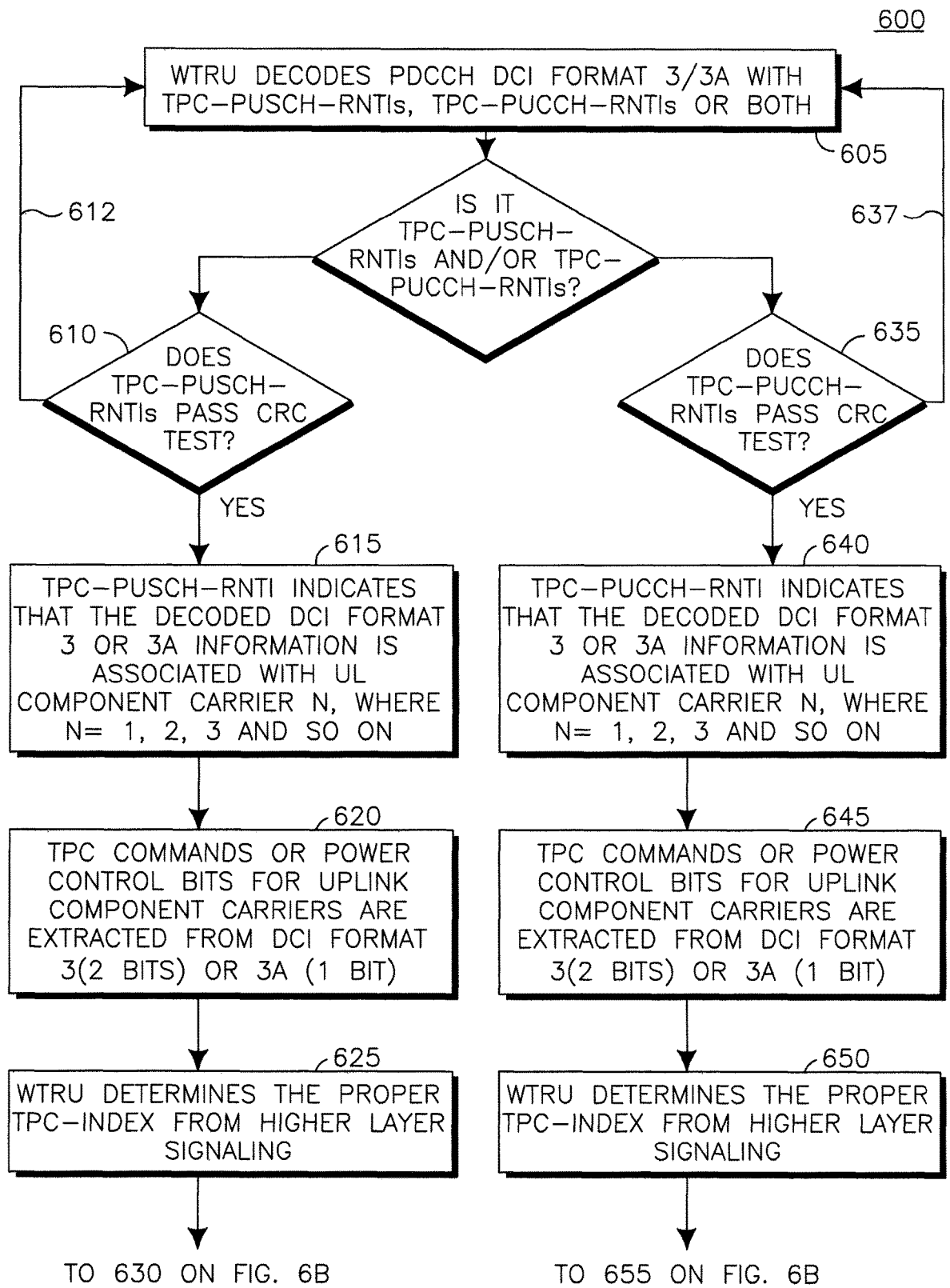
FIGS. 6A and 6B show an example flowchart of cross component carrier power control using transmit power control (TPC) physical uplink shared control channel (PUSCH) radio network temporary identifier (RNTI) (TPC-PUSCH-RNTIs), TPC physical uplink control channel (PUCCH) (TPC-PUCCH-RNTIs) or both.
Figure 6B:
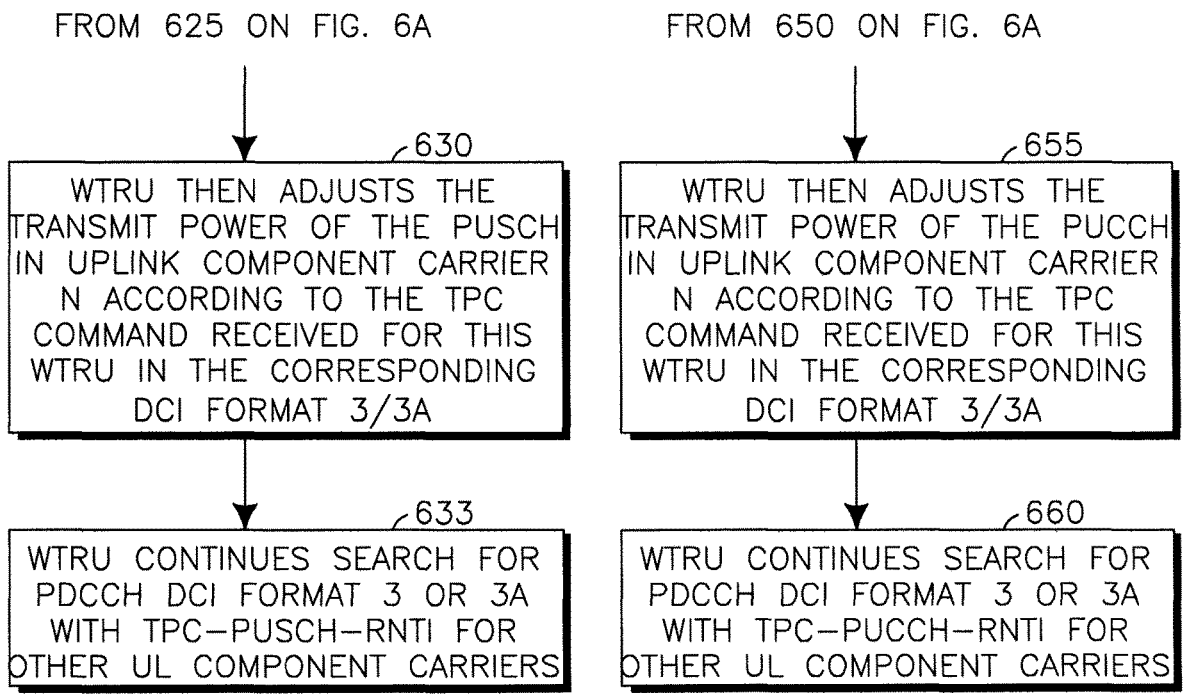

FIGS. 6A and 6B show an example flowchart 600 of cross component carrier power control using TPC-PUSCH-RNTIs, TPC-PUCCH-RNTIs or both. WTRU decodes PDCCH DCI format 3 or 3A with TPC-PUSCH-RNTIs, TPC-PUCCH-RNTIs or both (605). If it is a TPC-PUSCH-RNTI, the WTRU checks if the TPC-PUSCH-RNTI passes the CRC test (610). If the CRC test fails, searching is continued (612). If the CRC check passes for the TPC-PUSCH-RNTI, then the TPC-PUSCH-RNTI indicates that the decoded DCI format 3 or 3A information, e.g., transmit power control, is associated with UL component carrier n, where n=1, 2, 3 and so on (615). The WTRU extracts the transmit power control (TPC) commands from DCI format 3 or 3A (620). If DCI format 3 was sent, then the TPC command is a two bit power adjustment field and if DCI format 3A was sent, then the TPC command is an one bit power adjustment field. Since DCI format 3 or 3A carries multiple power control commands for a group of WTRUs, the WTRU needs to know which TPC command is applicable to the specific WTRU. This is generally configured by higher layer signalling, e.g., RRC signalling. In one example, the WTRU uses the parameter tpc-Index, which is sent by higher layers, to determine the index to the TPC command for the specific WTRU (625). The WTRU then adjusts the transmit power of the PUSCH in uplink component carrier n according to the TPC command received for this WTRU in the corresponding DCI format 3/3A (630). WTRU continues search for PDCCH DCI format 3/3As with TPC-PUSCH-RNTIs for other UL component carriers (633).

If it is a TPC-PUCCH-RNTI, the WTRU checks if the TPC-PUCCH-RNTI passes the CRC test (635). If the CRC test fails, searching is continued (637). If the CRC check passes for the TPC-PUCCH-RNTI, then the TPC-PUCCH-RNTI indicates that the decoded DCI format 3 or 3A information, e.g., transmit power control, is associated with UL component carrier n, where n=1, 2, 3 and so on (640). The WTRU extracts the transmit power control (TPC) commands from DCI format 3 or 3A (645). As noted above, if DCI format 3 was sent, then the TPC command is a two bit power adjustment field and if DCI format 3A was sent, then the TPC command is an one bit power adjustment field. Again as noted above, the WTRU needs to know which TPC command is applicable to the specific WTRU. In one example, the WTRU uses the parameter tpc-Index, which is sent by higher layers, to determine the index to the TPC command for the specific WTRU (650). The WTRU then adjusts the transmit power of the PUCCH in uplink component carrier n according to the TPC command received for this WTRU in the corresponding DCI format 3/3A (655). WTRU continues search for PDCCH DCI format 3/3As with TPC-PUCCH-RNTIs for other UL component carriers (660).

In another example, the WTRU may be assigned a C-RNTI_1 for Carrier 1D and Carrier 1U, C-RNTI_2 for Carrier 2D and Carrier 2U and C-RNTI_3 for Carrier 3D. Assuming that Carrier2D is an anchor or primary component carrier, the WTRU evaluates a PDCCH candidate on Carrier2D. The WTRU then checks for each PDCCH candidate for different DCI format length with address C-RNTI_1, C-RNTI_2 and C-RNTI_3. If PDCCH candidate's CRC matched with C-RNTI_2 and the PDCCH is DCI format 0, then the received uplink scheduling grant in DCI format 0 is applicable to Carrier2U. If PDCCH candidate's CRC matched with C-RNTI_1 and the PDCCH is DCI format 0, then the received uplink scheduling grant in DCI format 0 is applicable to Carried U.

Anchor or primary component carriers may be used separately for DL assignments and UL grants. To further balance signalling load and reduce the use of C-RNTIs, DL assignments and UL grants may be transmitted in two different anchor or primary component carriers. That is, one anchor or primary component carrier for DL assignment (DL assignment specific anchor/primary component carrier) and one anchor or primary component carrier for UL grant (UL grant specific anchor/primary component carrier). They may also be WTRU-specific. Each WTRU may be assigned, for example, C-RNTIs for corresponding UL/DL component carriers.

Alternatively, a RRC message to reassign WTRU to another anchor or primary component carrier may be useful not only for control region capacity load balancing but also in the context of sharing addresses. Also, dedicated signalling reassigning the anchor or primary component carrier may include for example C-RNTI re-assignment.

In another indication method, detection orders may be used to indicate component carriers. In this method, DL assignment to DL component carrier or UL grant to UL component carrier may be mapped based on the detection order of DL assignment or UL grant. Detection orders are specified such that there may be no ambiguity regarding the detection order. The rules for the sequence of detection based on control channel element (CCE) aggregation level (e.g., from highest to lowest level or from lowest to highest level), CCE addresses (e.g., start from address 0), search space, or other similar procedures may be defined or specified. Such rules are known to the base station and WTRU by predetermination, RRC configuration or L1/2 and RRC signalling. The mapping between detection order and carrier may be that the first detected DL assignment is for the first assigned DL component carrier, the second detected DL assignment is for the second assigned DL component carrier and so on. Similarly for the UL grant and UL component carrier, the mapping between detection order and component carrier may be that the first detected UL grant is for the first assigned UL component carrier, the second detected UL grant is for the second assigned UL component carrier and so on. The information about which DL/UL component carriers are assigned may be signalled. In this case, no RNTI or carrier ID in DL assignment or UL grant to indicate component carriers may be required. The reliability of this successive method may be increased by using large CCE aggregation level for the first few PDCCHs.

In another indication method, detection position such as search space partition or dedicated search space (or extended dedicated search space) corresponding to component carriers may be used to indicate component carriers. DL assignment to DL component carrier or UL grant to UL component carrier may be mapped based on the detection position, search space partition or dedicated search space (corresponding to component carriers) of the PDCCH carrying DL assignment or UL grant. Different potential search spaces, search space partitions or dedicated search spaces (either the same or extended search space as in LTE) are designated for different component carriers. The partitioning of the search space may be cell specific or WTRU specific. In this way, the WTRU learns the component carrier to be used from the position of the PDCCH (the dedicated search space or search space partitions where the PDCCH is detected). Furthermore, the WTRU may receive additional signalling to reduce the space that it must search to detect any possible PDCCH (e.g., a low data rate WTRU may be told to only search the PDCCH search space that could carry single component carrier grants).

Figure 10:
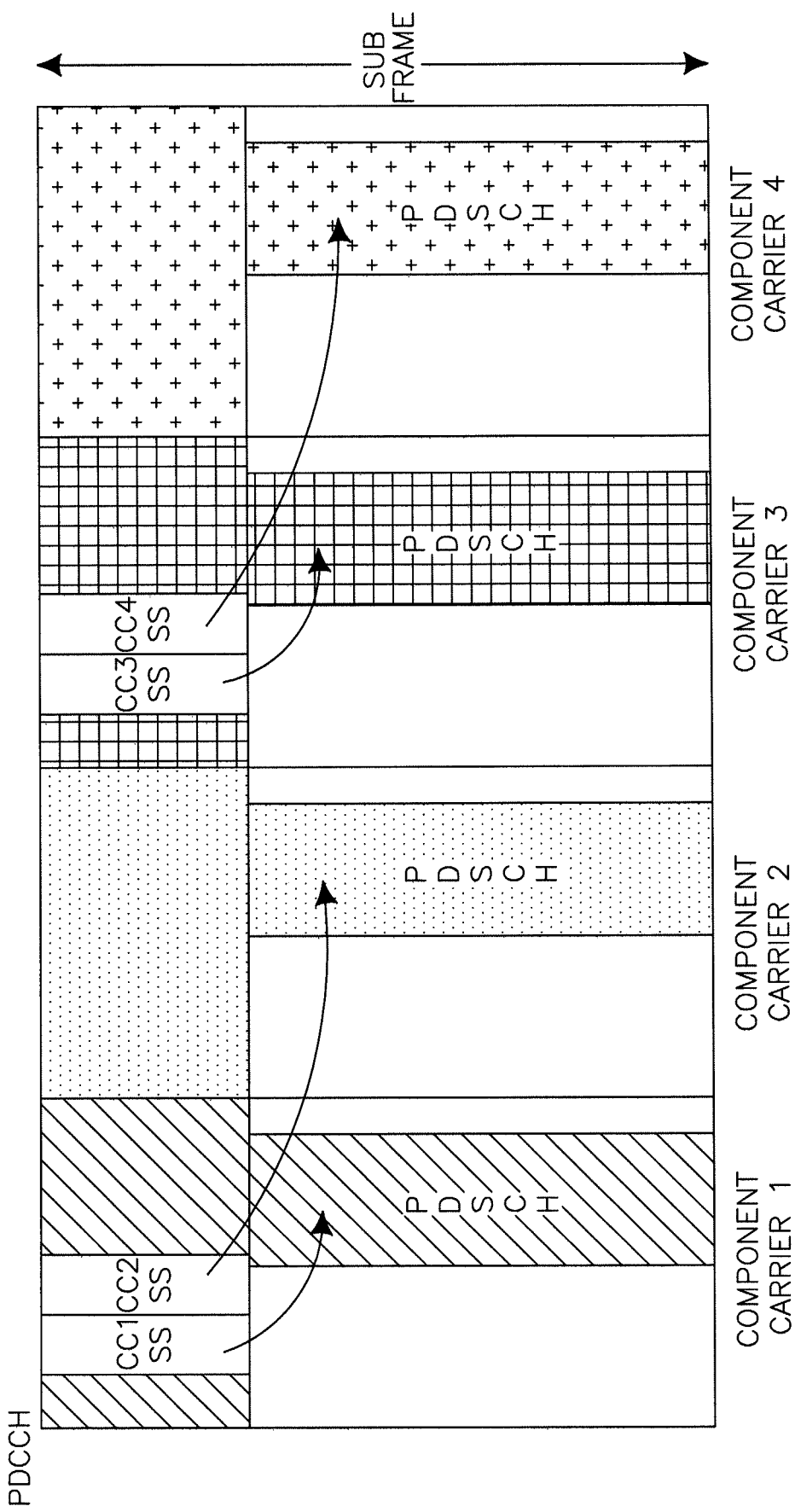
FIG. 10 shows an example block diagram of the relationship between component carriers and dedicated search spaces and cross carrier scheduling with limited scheduling capability.

Search space may be partitioned with respect to the LTE search space or new search space such that the PDCCH blind decoding complexity may be reduced due to a smaller search space. Search space may be dedicated to component carriers and the dedicated search space may be extended or expanded such that the PDCCH block probability may be reduced due to a larger search space. LTE search space may also be used such that there are multiple LTE search spaces in each component carrier for a given WTRU, and each of the search spaces is dedicated for a component carrier. This is illustrated in FIGS. 8 and 10, which are described in more detail below.

The search space may be predefined or fixed by system definition. Alternatively, the search space may be configured or signalled by higher layers using, for example, RRC signalling or a broadcast channel system configuration message or element. In one example, a search space is defined as a set of candidate control channels (PDCCHs) formed by the set of control channel elements (CCEs) for a given aggregation level which the WTRU is supposed to monitor or decode. A specific PDCCH is identifiable by the numbers of the corresponding CCEs in the control region. This is then used to determine or map to the component carrier.

Figure 7:
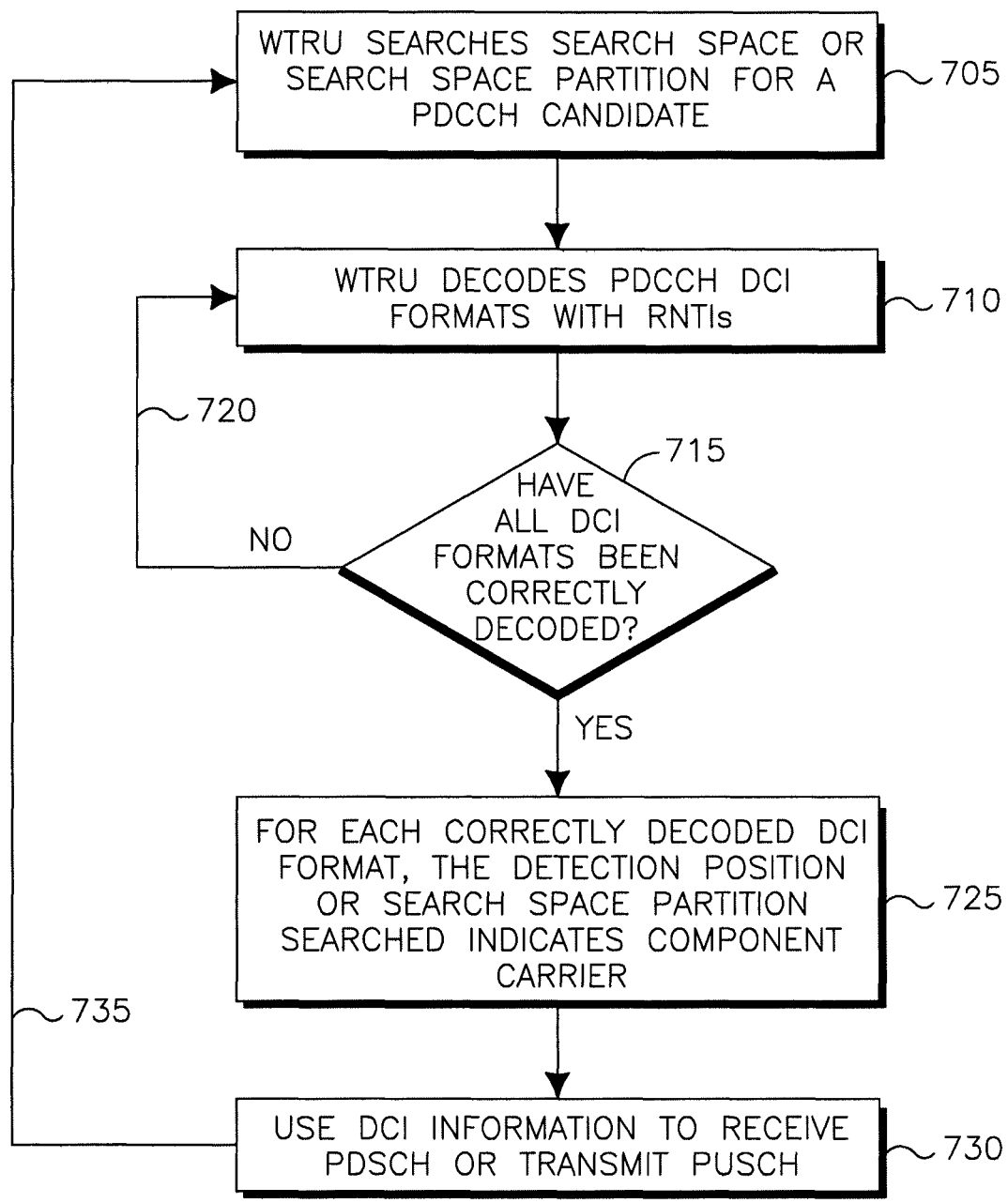
FIG. 7 shows an example flowchart for using detection position or search space partition to indicate component carriers.
Figure 8:
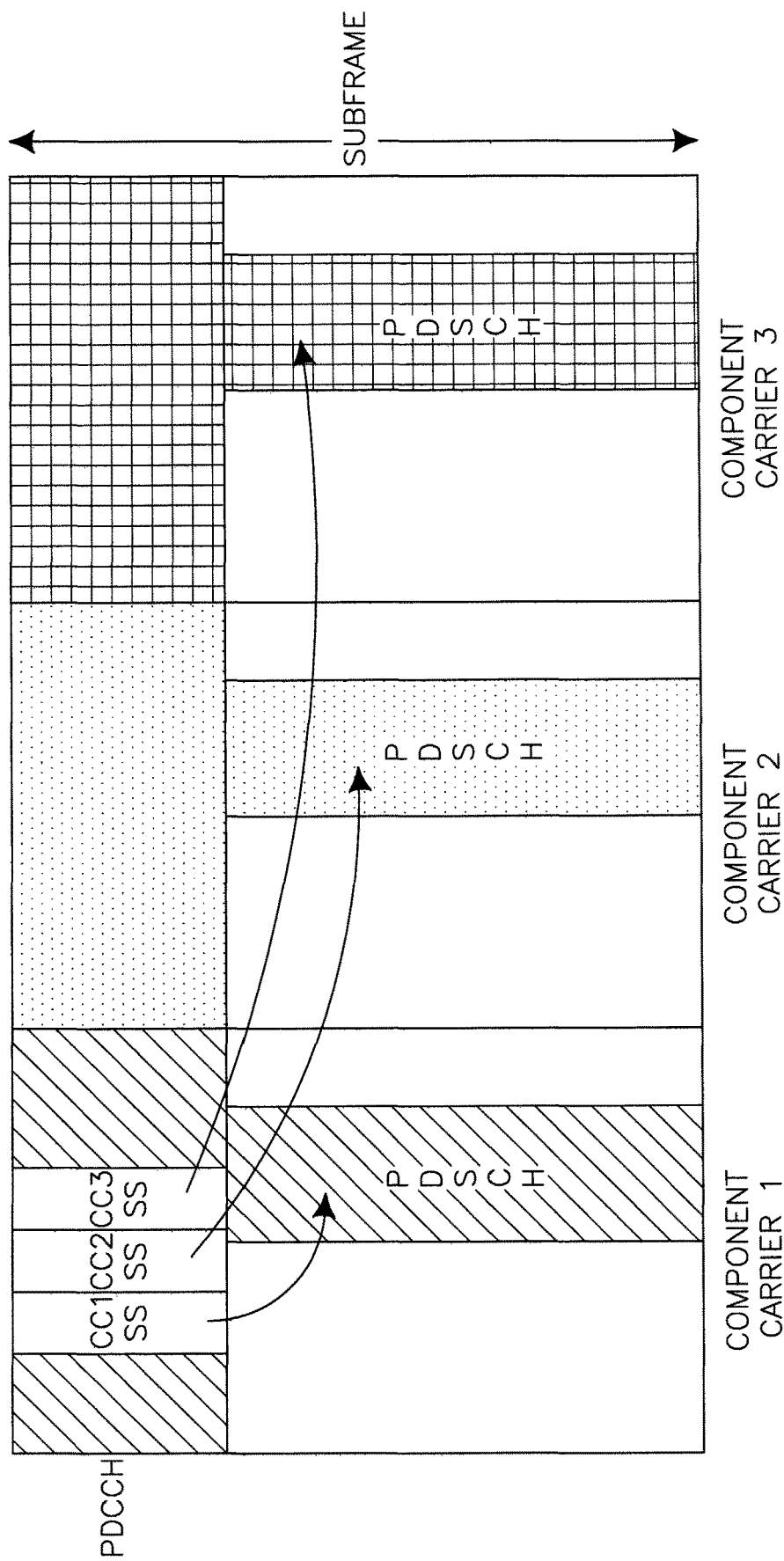
FIG. 8 shows an example block diagram of the relationship between component carriers and dedicated search spaces and cross carrier scheduling.

FIG. 7 shows an example detection position flowchart 700 for using search space partitions or dedicated search spaces to indicate component carriers and FIG. 8 shows an example block diagram of the relationship between the component carriers and dedicated search spaces and cross carrier scheduling. Referring to FIG. 7, the WTRU searches dedicated search spaces or search space partitions for a PDCCH candidate (705). The WTRU decodes PDCCH DCI formats with RNTIs (710) and then determines if the DCI format has been correctly decoded (715). If not, the WTRU tries another CRC or RNTI (720). If all the DCI formats have been correctly decoded, then for each correctly decoded DCI format, the WTRU uses the information with respect to where the PDCCH was detected to determine the relevant component carrier (725). The WTRU then uses the DCI information to receive the PDSCH or transmit the PUSCH (730). This is then repeated for the additional search space segments in the identified component carrier using the same RNTIs (735). Alternatively, the WTRU may search the search spaces in a parallel fashion.

The DCI information may allow cross carrier scheduling such that the DCI (in the PDCCH) in a component carrier (say CC x) may schedule PDSCH (or PUSCH) in a different component carrier (say CC y), where CC x may not be equal to CC y.

As shown in FIG. 8, each component carrier may have dedicated search spaces (SS) in a control region (PDCCH) corresponding to multiple component carriers. For example, in the control region of component carrier 1 (CC1) there are dedicated SSs for CC1, CC2, CC3, . . . , i.e., CC1 SS is for PDSCH (or PUSCH) of CC1, CC2 SS is for PDSCH (or PUSCH) of CC2, CC3 SS is for PDSCH (or PUSCH) of CC3. The WTRU only searches CC n SS for CC n, where n=1, 2, 3, . . . and SS is not shared between component carriers.

Figure 9:
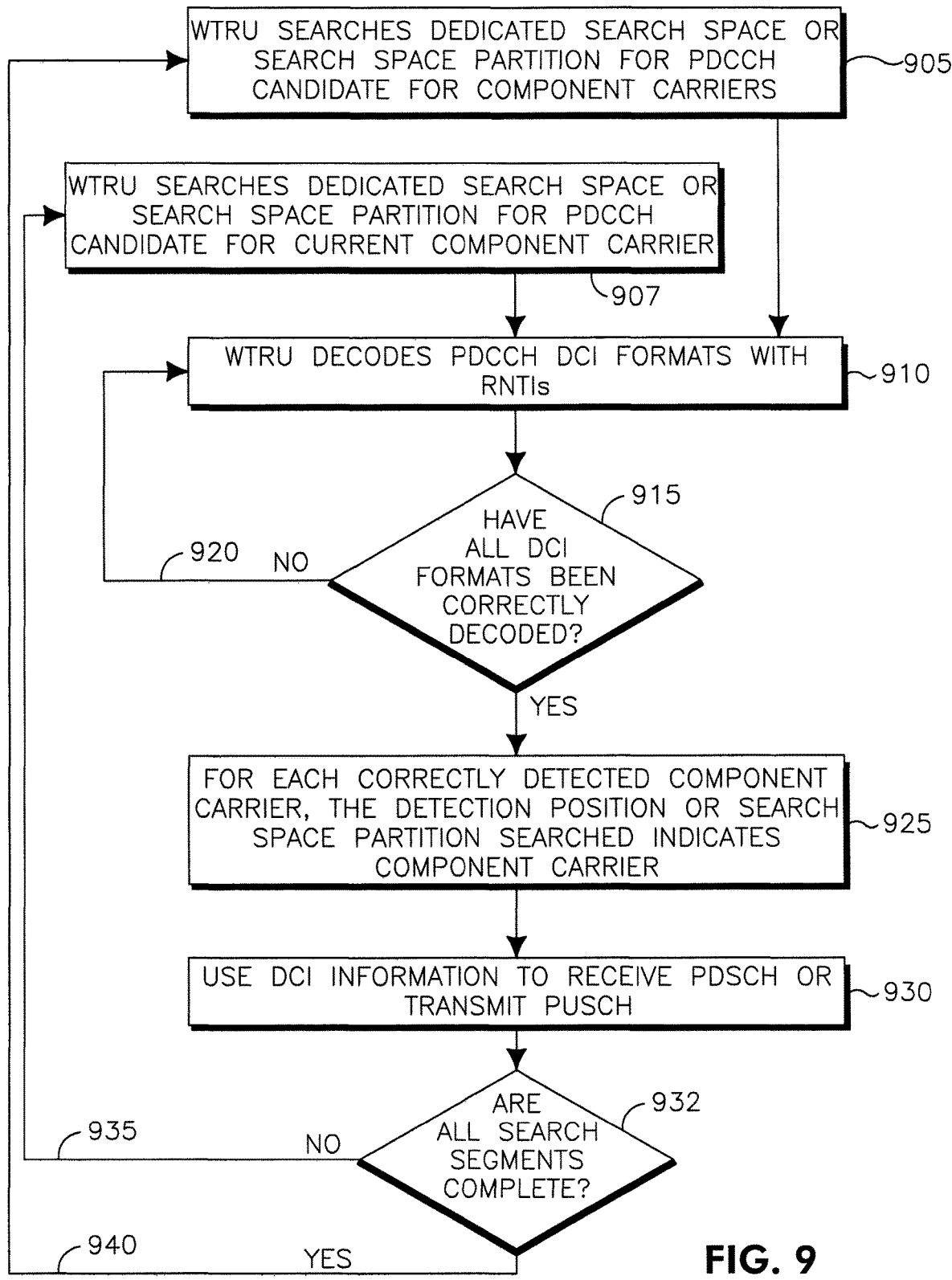
FIG. 9 shows another example flowchart for using detection position or search space partition to indicate component carriers.

FIG. 9 shows an example detection position flowchart 900 for using search space partitions or dedicated search spaces to indicate component carriers and FIG. 10 shows an example block diagram of the relationship between the component carriers and dedicated search spaces and cross carrier scheduling with limited scheduling. The WTRU searches dedicated search spaces or search space partitions for a PDCCH candidate for component carriers (905). WTRU decodes PDCCH DCI formats with RNTIs (910) and determines if the DCI format has been correctly decoded (915). If not, the WTRU tries another CRC or RNTI (920). If all the DCI formats have been correctly decoded, then for each correctly decoded DCI format, the WTRU uses the information with respect to where the PDCCH was detected to determine the relevant component carrier (925). WTRU then uses the DCI information to receive the PDSCH or transmit the PUSCH (930). If additional search segments exist (932), the search (907) is then repeated for the additional search space segments in the identified component carrier using the same RNTIs (935). If all search segments are complete then additional dedicated search spaces or search space partitions for PDCCH candidates may be searched for other component carriers (940). Additional searches, for instance, are configurable. The WTRU may be configured to search only in the control region of CC1. In this instance, the WTRU only searches CC1 SS, CC2 SS, CC3 SS and so on. Alternatively, the WTRU may be configured to search in control region of other CCs such as CC2 or CC3. In this instance, the WTRU may continue to search CC1 SS, CC2 SS, CC3 SS in control regions of CC2, CC3 or both. The WTRU may receive configuration information from higher layer signalling e.g., RRC signalling and it may be WTRU specific. If the WTRU is configured to search only in the control region of CC1, then scheduling flexibility is limited but PDCCH blind decoding complexity may be reduced. If the WTRU is configured to search in control region of multiple CCs, then scheduling flexibility is increased at the cost of higher PDCCH blind decoding complexity. Alternatively, the WTRU may search the search spaces in a parallel fashion.

The DCI information may allow cross carrier scheduling such that the DCI (in the PDCCH) in a component carrier (say CC x) may schedule PDSCH (or PUSCH) in a different component carrier (say CC y), where CC x may not be equal to CC y but in a limited fashion as shown in FIG. 10.

FIG. 10 shows the dedicated SS for CCs but with limited scheduling capability. Cross carrier scheduling is limited in such way that a DCI in a CC (say CC x) can only schedule PDSCH (or PUSCH) in a different CC (say CC y) within a limited CC subset. For example, CC1 has information with respect to receiving PDSCH (or PUSCH) with respect to CC1 and CC2 while CC3 has information with respect to receiving PDSCH (or PUSCH) with respect to CC3 and CC4.

The WTRU is semi-statically configured via higher layer signalling to receive PDSCH data transmissions in a set of DL component carriers (say CC1, CC2 as one set, and CC3, CC4 as another set as shown in FIG. 10) signalled via PDCCH transmitted in a specified or indicated DL component carrier (say CC1 in FIG. 8 or CC1, CC3 in FIG. 10) belonging to the said set of DL component carriers or the said group of DL component carriers. The WTRU may not be required to receive PDSCH data transmissions in a set of DL component carriers signalled via PDCCH transmitted in a DL component carrier not belonging to the said set of DL component carriers or the said group of DL component carriers.

The WTRU may monitor a set of PDCCH candidates for control information in a specified or indicated DL component carrier belonging to the set of component carriers (say CC1, CC2 as one set, and CC3, CC4 as another set as shown in FIG. 10) or the group of component carriers (say CC1, CC2 as one group, and CC3, CC4 as another group in FIG. 10) in every non-DRX subframe, where monitoring implies attempting to decode each of the PDCCHs in the PDCCH candidate set according to all the monitored DCI formats. The WTRU is not required to monitor a set of PDCCH candidates for control information in a DL component carrier that belongs to the different set or group of component carriers. The WTRU is not required to monitor a set of PDCCH candidates for control information in a DL component carrier that is not specified or indicated within the set or group of component carriers.

For FDD and normal HARQ operation, the WTRU shall upon detection of a PDCCH with uplink grant such as DCI format 0 and/or a PHICH transmission in the set of DL component carriers in subframe n intended for the WTRU, adjust the corresponding PUSCH transmission in the set of UL component carriers that is linked with the set of DL component carriers in subframe n+4 according to the PDCCH and/or PHICH information that are received.

In another indication method, detection time may be used to indicate component carriers. The time may be associated with the subframe or other specific time interval or period. The subframe in which a PDCCH may be detected (in part or in whole) may determine the component carrier to be used with the allocation grant. The pattern mapping subframe to component carrier may be cell specific or WTRU specific. For example, in subframes=0 mod 3, use component carrier c1, in subframes=1 mod 3, use component carrier c2, and in subframes=2 mod 3, use component carrier c3.

In an alternative method, suppose there are up to K Orthogonal Frequency Division Multiplex (OFDM) symbols used in the DL for PDCCH (note that K=3 in LTE). The network may map UL grant/DL assignment for up to K component carriers in K different OFDM symbols. Upon successful decoding of a PDCCH, the WTRU may determine the carrier index of the UL grant/DL assignment according to the time location (i.e., which OFDM symbol) within the downlink control region.

In another indication method, an explicit component carrier ID may be used to indicate component carriers. Bits may be inserted for carrier ID in a DCI format to indicate DL/UL component carriers. For example, 3 bits may be used to represent 8 UL or DL component carriers.

In another indication method, scrambling sequence of the PDCCH may be used to indicate component carrier index. In LTE, PDCCH may be scrambled with a sequence that is a function of cell ID and sub-frame index. In this embodiment, a scrambling sequence may used that is a function of cell ID, sub-frame index and component carrier index to scramble PDCCH carrying UL grant/DL assignment. Upon descrambling of the PDCCH, the WTRU may determine the component carrier index of the decoded UL grant/DL assignment.

In another indication method, combinations of the methods described herein may be used to indicate component carrier. As an example of a combination of the detection time and detection position method, K=3 OFDM symbols may be used in the DL for PDCCH. Since there are no more than 5 aggregated component carriers in each direction, the network may configure 2 WTRU-specific search spaces for a particular WTRU. If a PDCCH (containing an assignment) is decoded by the WTRU in search space i (i=1 or 2) and at OFDM symbol k (k=1, 2 or 3), then the WTRU determines the component carrier index according to a predetermined mapping f(i,k). Other combinations or variations using the described methods herein are also possible.

In another unified method for DL assignment and UL grant, joint coding and joint transmission methods may be used. A single joint DL assignment or UL grant is transmitted in the anchor or primary component carrier. In one approach, an explicit bitmap and/or special PDCCH may be used for the assignment. In a first option, bits may be inserted in a DCI format (PDCCH) as a bitmap for each joint DL assignment or UL grant. In this option, ON or "1" means the component carrier has control information and OFF or "0" means no control information. For example, a bitmap of "10101" may indicate that component carriers 1, 3 and 5 have control information for DCI #1, 2 and 3, respectively. That is, the WTRU knows that three sets of DCI are available. This may be used in combination with a dynamic DCI format. To reduce blind format detection, the number of component carriers may be signalled to the WTRU via PDCCH, RRC or higher layer signalling. For example, if the number of DL component carriers and UL component carriers is known, the size of the DCI format for DL assignment and UL grant is known. If the number of DL and UL component carriers is signalled via L1/2 control signalling, a special PDCCH may be transmitted. The special PDCCH may carry the number of DL or UL component carriers and may be transmitted in certain subframes. For example, the special PDCCH may be transmitted in every M subframes, where M is configurable. Alternatively, some subframes may be configured for special PDCCH transmission. The special PDCCH may also carry bitmaps for DL or UL component carriers and may be transmitted in certain subframes as described previously.

In a second option using explicit bitmaps, RRC signalling or other higher layer signalling may carry bits as a bitmap for joint DL assignments or UL grants.

In a second method for joint coding and/or joint transmission, a static DCI format may be used for the assignments. If the number of DL and UL component carriers is not known or signalled, a static format may be used at the expense of higher overhead. In this case, the DCI format is fixed in length and no bitmap may be needed. Static DCI format and overhead may be designed for a maximum number of component carriers, for example, five component carriers. Alternatively, static DCI format and overhead may be designed for some fixed number of component carriers, such as three component carriers, which is less than the maximum number of component carriers.

A non-unified method for UL grant and DL assignment is described herein. Different methods may be used for UL grants and DL assignments. That is, one method may be used for DL assignment and another method may be used for UL grant. For example, separate coding/separate transmission may be used for DL assignment, and separate coding/joint transmission or joint coding/joint transmission may be used for UL grant.

For DL assignment, separate coding/separate transmission with one-to-one mapping between DL component carrier and DL component carrier that transmits the DL assignment may be used. For UL grant, separate coding/joint transmission with RNTIs, such as those described herein, may be used to indicate UL component carriers. Alternatively, joint coding/joint transmission with a bitmap indicating UL component carriers may be used. Other combinations of methods described in the unified method may also be used.

Alternative UL and DL associations may also be used. The UL PDCCH component carrier to UL-SCH component carrier pairing methods described where z=x, z=f(y) or other described UL/DL alignment methods may also be applied to other required UL/DL associations. For example, when a DL-SCH transmission occurs, and UL hybrid automatic repeat request (HARQ) feedback indicating successful or unsuccessful transmission may need to be transmitted, it may be necessary to know which UL component carrier may report the HARQ feedback for the DL-SCH transmission. Similarly when a UL-SCH transmission occurs, it may be necessary to know which component carrier DL HARQ feedback may be assigned to.

In another example, when the WTRU reports channel conditions or uplink control information such as channel quality indicator, precoding matrix indication, or rank indication (CQI/PMI/RI) on a PUCCH, it may be necessary to associate the DL component carrier with an UL component carrier carrying PUCCH.

The UL/DL carrier associations used for pairing DL PDCCH allocations with UL-SCH transmissions may also be used to associate the UL/DL pairing of channel quality indicator (CPI), precoding matrix indicator (PMI), rank indicator (RI) or acknowledge/negative acknowledge (ACK/NACK) reporting. DL component carrier #x may be paired with UL component carrier #y such that WTRU receives PDCCH in DL component carrier #x and transmits PUSCH in UL component carrier #y accordingly. UL component carrier #y may be used to report CQI, PMI, RI or ACK/NACK corresponding to DL component carrier #x.

As described herein, the using of different RNTI addresses, such as C-RNTI or SPS-C-RNTI, to indicate to which uplink component carrier the DCI format may lead to, decreases the number of available RNTI that may be shared among the WTRUs. Different approaches are described herein to show how the network may share the different RNTI address across the different frequencies among the different users.

The following describes how to reuse C-RNTI for PDCCH techniques in carrier aggregation such as separate PDCCH coding on a anchor/primary component carrier; separate PDCCH coding on separate component carriers; and joint PDCCH coding on a anchor/primary component carrier.

In an example of separate PDCCH coding on a anchor/primary component carrier, it may be assumed that user one has an anchor component carrier 1D with 1D, 2D, ... $X^1D$ and 1U, 2U, ..., $Y^1U$ component carriers with assigned RNTIs: C-RNTI-1One, C-RNTI-2One, ..., C-RNTI-Y1One, if $Y^1$ is larger than $X^1$ and user two has an anchor/primary component carrier 2D with 1D, 2D, ... $X^2D$ and 1U, 2U, ..., $Y^2U$ component carriers with assigned RNTIs: C-RNTI-1Two, C-RNTI-2Two, ..., CRNT-$Y^2$Two, if $Y^2$ is larger than $X^2$.

Since the 2 users do not share the same search space as they are on different anchor/primary component carriers, it shows that users on the same anchor/primary component carrier must not share a RNTI. Therefore, a technique by which users are reassigned to other anchor component carriers may be useful not only for control region capacity load balancing but also in the context of sharing addresses. Also, dedicated signalling reassigning the anchor component carrier may include RNTI reassignment such as C-RNTI reassignment.

Described herein is a capacity analysis for this example. Assume a cell has 5 component carriers in the uplink and 4 component carriers in the downlink. C-RNTI being a 16 bit address, the network may therefore theoretically assign 65536 C-RNTIs minus 2 addresses reserved for paging RNTI (P-RNTI) and system information RNTI (SI-RNTI), or 65534. In this context, the cell may assign equally up to 65564/5 users on each downlink component carrier or downlink anchor component carrier. Therefore, for the asymmetrical case where the number of anchor component carriers (downlink) or downlink component carriers is larger than the number of uplink component carriers, the cell may support up to 65534 users. For the asymmetrical case, where the number of uplink component carriers is larger than the number of downlink component carriers, than the limit may be somewhat lower by a factor equal to Number of DL component carriers/Number of UL component carriers. In our case, 80% of 65534 users.

Therefore, the usage of supplemental C-RNTI addresses to indicate to which component carrier the DCI format applies to may not impact the number of theoretical users in a cell if an anchor component carrier approach with separate coding is used. This theoretical analysis assumes all users are LTE-A capable and are pre-configured with the maximum number of aggregate component carriers in the uplink and the downlink in the cell.

In an example of separate PDCCH coding on separate component carriers, a first case assumes a full flexibility case, where the PDCCH received on any DL may map to any uplink component carrier. In this case, assuming that user one has 1D, 2D, ... $X^1$D and 1U, 2U, ..., $Y^1$U component carriers with assigned RNTI: C-RNTI-1One, C-RNTI-2One, ..., CRNT-$Y^2$One, if $Y^1$ is larger than $X^1$ and user two has 1D, 2D, ... $X^2$D and 1U, 2U, ..., $Y^2$U component carriers with assigned RNTI: C-RNTI-1Two, C-RNTI-2Two, ..., CRNT-$Y^2$Two, if $Y^2$ is larger than $X^2$. In this context, since the WTRU-dedicated search space of user one and user two may overlap on any downlink component carrier, addresses may not be reused.

Described herein is a capacity analysis for this example. Assume a cell has 5 component carriers in the uplink and 4 component carriers in the downlink. C-RNTI being a 16 bit address, the network may therefore theoretically assign 65536 C-RNTIs minus 2 addresses reserved for P-RNTI and SI-RNTI, or 65534. In this context, the cell may only assign up to 65534/5 users in total in the cell.

A second case assumes a limited flexibility case, where the PDCCH receives a component carrier that may map to one component carrier in the uplink. In the case where more uplink component carriers are configured than in the downlink, a given downlink component carrier may be assigned 2 or more addresses to differentiate DCI formats allocated in the uplink. This theoretical analysis assumes all users are LTE-A compatible and are pre-configured with the maximum number of aggregate component carriers in the uplink and the downlink in the cell.

Described herein is a capacity analysis for this example. Assume a cell with 4 downlink component carriers and 5 uplink component carriers. One downlink component carrier may be assigned an additional address. In this context, since each user needs 2 addresses to support this asymmetrical case, the theoretical limit would be 65534/2 or 65534/ (number of uplink component carriers–number of downlink component carriers). This theoretical analysis assumes all users are LTE-A compatible and are pre-configured with the maximum number of aggregate component carriers in the uplink and the downlink in the cell.

In an example of joint PDCCH coding on a anchor/primary component carrier, joint PDCCH coding may support multiple assignments/grants to different component carriers with a common CRC, thus it cannot rely on this method of using different C-RNTI or SPS-C-RNTI addresses to indicate to which uplink component carrier the DCI format is applicable.

Table 1 is a summary of the theoretical capacity analysis described herein.

This theoretical analysis assumes all users are LTE-A compatible and are pre-configured with the maximum number of aggregate component carriers in the uplink and the downlink in the cell. Also, no SPS-C-RNTI may be allocated.

While the present invention has been described in terms of the preferred embodiment, other variations which are within the scope of the invention will be apparent to those skilled in the art.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

TABLE 1

| PDCCH coding and assignment | Theoretical user limit per cell |
|---|---|
| A. Separate PDCCH coding on a anchor component carrier | 65534 * DL component carriers/UL component carriers if UL > DL or 65534 |
| B. Separate PDCCH coding on separate component carriers - Full flexible case (case 1) | 65534/UL component carriers |
| B. Separate PDCCH coding on separate component carriers - Not flexible case (case 2) | 65534/(UL component carriers-DL component carriers) if UL > DL or 65534 |
| C. Joint Coding | Not applicable, cannot rely on this technique |

What is claimed is:

1. A wireless transmit receive unit (WTRU), the WTRU comprising:
a receiver; and
a processor;
the processor and receiver configured to:
receive an indication of one or more search spaces for one or more physical downlink control channel (PDCCH) candidates and an indication of at least one downlink control information (DCI) format of a plurality of DCI formats for each search space of the one or more search spaces;
monitor, in the one or more search spaces, the one or more PDCCH candidates having a DCI format of the at least one DCI format indicated; and
receive DCI associated with a user identity of the WTRU via at least one PDCCH transmission; and
receive data via at least one physical downlink shared channel (PDSCH) transmission indicated by the at least one PDCCH transmission.

2. The WTRU of claim 1, wherein orthogonal frequency division multiplexing subcarriers via which to receive the data are indicated by the at least one PDCCH transmission.

3. The WTRU of claim 1, wherein a first DCI format of the plurality of DCI formats includes a carrier indicator that indicates a carrier via which a PDSCH transmission is to be received.

4. The WTRU of claim 3, wherein a second DCI format of the plurality of DCI formats does not include a carrier indicator.

5. The WTRU of claim 4, wherein the second DCI format has fewer bits that the first DCI format.

6. The WTRU of claim 4, wherein the first DCI format is associated with a first search space and the second DCI format is associated with a second search space.

7. The WTRU of claim 1, wherein the processor and receiver are further configured to receive a first PDCCH transmission via a first carrier and to receive a second PDCCH transmission via a second carrier.

8. The WTRU of claim 1, wherein the one or more search spaces includes a user specific search space.

9. A method performed by a wireless transmit receive unit (WTRU), the method comprising:
receiving an indication of one or more search spaces for one or more physical downlink control channel (PDCCH) candidates and an indication of at least one downlink control information (DCI) format of a plurality of DCI formats for each search space of the one or more search spaces;
monitoring, in the one or more search spaces, the one or more PDCCH candidates having a DCI format of the at least one DCI format indicated;
receiving DCI associated with a user identity of the WTRU via at least one PDCCH transmission; and
receiving data via at least one physical downlink shared channel (PDSCH) transmission indicated by the at least one PDCCH transmission.

10. The method of claim 9, wherein orthogonal frequency division multiplexing subcarriers via which to receive the data are indicated by the at least one PDCCH transmission.

11. The method of claim 9, wherein a first DCI format of the plurality of DCI formats includes a carrier indicator that indicates a carrier via which a PDSCH transmission is to be received.

12. The method of claim 11, wherein a second DCI format of the plurality of DCI formats does not include a carrier indicator.

13. The method of claim 12, wherein the second DCI format has fewer bits that the first DCI format.

14. The method of claim 12, wherein the first DCI format is associated with a first search space and the second DCI format is associated with a second search space.

15. The method of claim 9, further comprising receiving a first PDCCH transmission via a first carrier and receiving a second PDCCH transmission via a second carrier.

16. The method of claim 9, wherein the one or more search spaces includes a user specific search space.

17. The WTRU of claim 4, wherein the at least one PDCCH transmission is received with the second DCI format.

18. The method of claim 12, wherein the at least one PDCCH transmission is received with the second DCI format.

* * * * *